United States Patent [19]

Watanabe et al.

[11] Patent Number: 4,649,432
[45] Date of Patent: Mar. 10, 1987

[54] VIDEO DISPLAY SYSTEM

[75] Inventors: Yuji Watanabe; Yasuyuki Endoh, both of Tokyo, Japan

[73] Assignee: Sony Corporation, Tokyo, Japan

[21] Appl. No.: 694,956

[22] Filed: Jan. 25, 1985

[30] Foreign Application Priority Data

Jan. 27, 1984 [JP] Japan ................................. 59-13878

[51] Int. Cl.⁴ .......................... H04N 3/15; H04N 5/70
[52] U.S. Cl. ...................................... 358/241; 340/793
[58] Field of Search ........................ 358/241, 59, 168; 340/793, 781

[56] References Cited

U.S. PATENT DOCUMENTS

| | | | |
|---|---|---|---|
| 3,838,209 | 9/1974 | Tsuchiya et al. | 358/241 |
| 4,340,889 | 7/1982 | Knight et al. | 340/793 |
| 4,353,062 | 10/1982 | Lorteije et al. | 358/241 X |
| 4,516,118 | 5/1985 | Wahlquist | 340/793 X |
| 4,554,539 | 11/1985 | Graves | 340/781 X |
| 4,591,902 | 5/1986 | Masubuchi | 358/241 X |

Primary Examiner—Michael A. Masinick
Assistant Examiner—E. Anne Toth
Attorney, Agent, or Firm—Hill, Van Santen, Steadman & Simpson

[57] ABSTRACT

A video display system is disclosed, which includes a display device including a plurality of display cells arranged in an X-Y matrix form, a video signal source for supplying a digital video signal, a pulse width modulator connected to the video signal source for deriving a PWM signal corresponding to the brightness level of the digital video signal, the pulse width modulator including a counter supplied with the digital video signal as a datum signal and a clock signal generator for supplying a clock signal to the counter, and a signal supplying circuit connected to the pulse width modulator for supplying the PWM signal to the display device and reproducing a picture thereon. In this case, the video display system of this invention further includes a control circuit connected to the clock signal generator for changing the frequency of the clock signal supplied to the counter and controlling the brightness of the picture reproduced on the display device.

5 Claims, 31 Drawing Figures

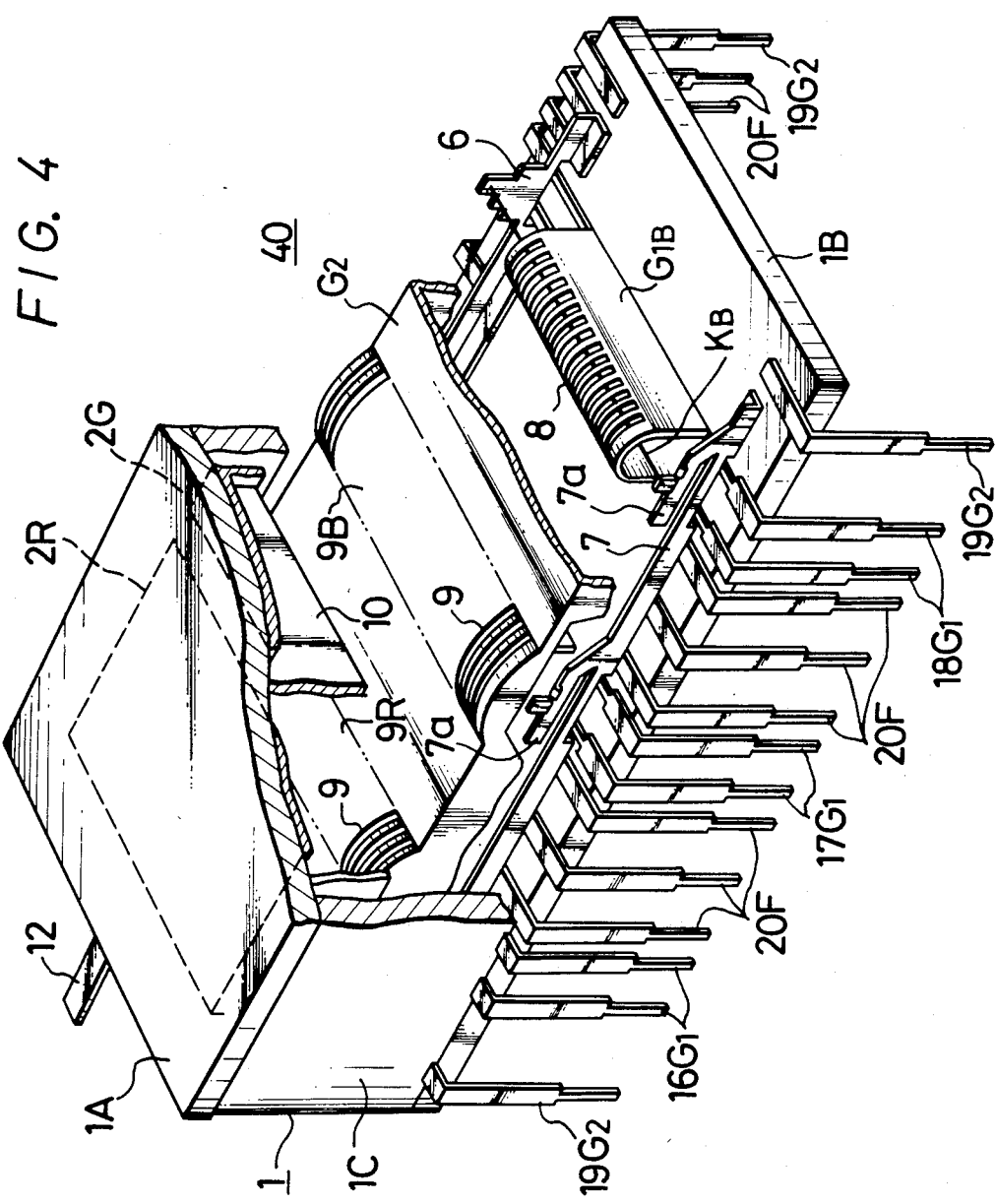

VIDEO DISPLAY SYSTEM

BACKGROUND OF THE INVENTION

1. Field of the Invention

The present invention relates generally to a video display device and is directed more particularly to a video display system in which a number of display cells are arranged in a 2 dimensional fashion or in an X-Y matrix form and these display cells are respectively driven by desired data to display a desired image.

2. Description of the Prior Art

A video display device in which a number of display cells are arranged in an X-Y matrix form and these display cells are respectively driven by desired data to display a desired picture has already been proposed.

The same applicant has proposed as the display cell usable in the above video display device the following ones.

Referring to FIGS. 1 to 4, which are a front view of a luminescent display cell, a sectional view taken on line A—A thereof, a sectional view taken on line B—B thereof, and a partially cut-away perspective view of the cell. In the figures, reference numeral 1 denotes a glass envelope comprising a front panel 1A, a rear plate 1B and a side wall 1C. Within the glass envelope 1 are disposed a plurality of luminescent display segments 2 (2R, 2G, 2B), a plurality of cathodes K ($K_R$, $K_G$, $K_B$) and first grids $G_1$ ($G_{1R}$, $G_{1G}$, $G_{1B}$) in corresponding relation to each display segment, and a common second grid (accelerating electrode) $G_2$. The display segments 2 each comprise a phosphor layer formed on the inner surface of the front panel 1A. There are formed three display segments 2R, 2G, and 2B for the luminescence of red, green and blue, respectively. More particularly, as shown in FIG. 5, a carbon layer 3 as a conductive layer is printed in the form of a frame on the inner surface of the front panel 1A. In spaces in the frame, red, green and blue phosphor layers 2R, 2G and 2B are formed by printing as display segments so as to partially overlap the carbon layer 3. Throughout the surfaces of these phosphor layers a metal back layer 5 is formed, e.g. an aluminum layer, through a filming layer 4. Furthermore, in opposed relation to the display segments 2R, 2G and 2B comprising the above phosphor layers and inside the rear panel 1B wire cathodes $K_R$, $K_G$ and $K_B$ are positioned, first grids $G_{1R}$, $G_{1G}$ and $G_{1B}$ opposite these wire cathodes, and the second grid $G_2$ in common to the three first grids $G_{1R}$, $G_{1G}$ and $G_{1B}$. Each wire cathode K is formed, for example, by coating the surface of a tungsten heater with carbonate as an electron emissive material. The wire cathodes $K_R$, $K_G$ and $K_B$ are each stretched between a pair of conductive support members 6 and 7 which are disposed on both side portions of the rear panel 1B. One support member 6 is for fixing one end of each wire cathode, while the other support member 7 is provided with a spring portion 7a to which is fixed the other end of each wire cathode. According to this arrangement, an even extension of the wire cathode due to a rise of the temperature would be absorbed by the spring portion 7a, and thus the wire cathode never becomes loose. The first grids $G_{1R}$, $G_{1G}$ and $G_{1B}$ are formed in a half-cylindrical shape having a cylindrical surface in corresponding relation to the wire cathodes, and a plurality of slits 8 are formed in the cylindrical surface at a predetermined pitch along the longitudinal direction of the same surface. The slits 8 are for the transmission therethrough of electrons radiated from the wire cathode K. The second grid $G_2$ is formed with slits 9 in portions corresponding to the first grids $G_{1R}$, $G_{1G}$ and $B_{1B}$ and in positions corresponding to the slits 8 of the first grids. In this case, slit portions 9R, 9G and 9B of the second grid $G_2$ may be formed so as to have cylindrical surfaces concentric with the corresponding first grids $G_{1R}$, $G_{1G}$ and $G_{1B}$. In this construction, electron beams from the wire cathodes are radiated rectilinearly through the slits 8 and 9 of the first and second grids and are spread with respect to the longitudinal direction of the slits. On the other hand, the portions of the second grid in which are formed the slits 9 may be horizontal as shown in FIG. 6. In this case, the electron beam is radiated so that it passes through the second grid and then is curved somewhat inwardly with respect to the longitudinal direction of the slits, as shown in dotted line 30'.

On the other hand, a separator 10 formed of a conductive material is disposed to surround the display segments or elements 2R, 2G and 2B. The separator 10 not only serves as a shield for preventing a secondary electron 31 (see FIG. 6) induced by impingement of electron beam from cathode against the first or second grid $G_1$ or $G_2$ from rendering an adjacent display segment luminous, but also serves to form a diffusion lens which functions to spread electron beam 30 from each wire cathode K so that the electron beam is radiated throughout the corresponding display segment 2. In addition, the separator 10 is used also as power supply means for supplying a high voltage, e.g. 10 KV, to each display segment. In assembling, the separator 10 is supported between the front panel 1A and side wall 1C of the glass envelope 1 and fixed by frit. More specifically, as shown in FIG. 7, the separator 10 is in the form of a frame partitioned in threes to surround the display segments, and on first opposed upper ends thereof are formed outwardly projecting supporting pieces 11, while on the other opposed upper ends are formed anode leads 12 for the supply of high voltage (anode voltage). Furthermore, on the side portions of the separator 10 are formed outwardly bent elastic positioning pieces 13. When the separator 10 is inserted from above into the inside of side wall 1C, as shown in FIG. 8, the supporting pieces 11 abut the upper end face of the side wall 1C to thereby support the separator 10, and at the same time the bent portions 13 abut the inner surface of the side wall 1C to thereby position the separator 10 in central fashion. Also provided on the upper end portion of the separator 10 are inwardly bent lugs 14 each having a projection 15 formed on the surface thereof. When the front panel 1A is placed and sealed on the side wall 1C after enclosing the separator 10 in the side wall 1C, the projections 15 contact the carbon layer 3 or the metal back layer 5 (see FIG. 9). As a result, the high voltage from the anode leads 12 is fed in common to the display segments 2R, 2G and 2B. In an assembled state, the anode leads 12 to which is applied the high voltage are drawn out to the exterior through the sealed portion between the front panel 1A and the upper end face of the side wall 1C, while the leads of the wire cathodes K, first grid $G_1$, and second grid $G_2$ are drawn out to the exterior through a sealed portion between the rear plate 1B and the side wall 1C. The leads of the cathodes K, first grids $G_1$, and second grid $G_2$ are brought out together for supporting purposes. For example, in each of the first grids $G_{1R}$, $G_{1G}$ and $G_{1B}$, two leads on each side, namely, a total of four leads on both sides, are brought out as leads 16G$_1$, 17G$_1$, and 18G$_1$ (see FIG. 4). In the case of the second grid G$_2$, four leads 19G$_2$ are brought out corresponding to the four corners of the rear panel. Leads 20F of the cathodes K are brought out together to the right and left from both support members 6 and 7. The leads, 20F of the cathodes are connected in common for each of the support members 6 and 7. Also with respect to each of the first and second grids G$_1$ and G$_2$, the corresponding leads are connected in common.

The glass envelope 1 is provided by sealing the front panel 1A, side wall 1C and rear plate 1B with respect to each other by frits 22 (see FIG. 9). To the rear plate 1B is a chip-off pipe 21 for gas exhaust fixed by frits.

Operation of the above construction will now be explained. An anode voltage of, say, 10 KV or so is supplied through the anode leads 12 to the red, green and blue display segments 2R, 2G and 2B. To each of the first grids G$_{1R}$, G$_{1G}$ and G$_{1B}$ is applied a voltage of, say, 0–30 V, while to the second grid G$_2$ is applied a voltage of, say, 300 V. The wire cathodes K$_R$, K$_G$ and K$_B$ are of 60–70 mW or so per wire. In this construction, the anode side and the second grid G$_2$ are fixed in voltage, while the voltage applied to the first grids G$_1$ is changed to turn on and off the display segments selectively. More particularly, when OV is applied to a first grid G$_1$, an electron beam from cathode K is cut off and the corresponding display segment 2 is not rendered luminous. When, say, 30 V is applied to a first grid G$_1$, an electron beam from cathode K passes through the first grid G$_1$, then is accelerated by the second grid G$_2$ and impinges upon the phosphor of the corresponding display segment 2 to make the latter luminous. At this time, the luminance is controlled by controlling the pulse width (duration) of the voltage (30 V) applied to the first grid G$_1$. Further, as shown in FIG. 6, the electron beam from cathode K is spread by the separator 10 and radiated to the entire surface of the display segment 2. When the electron beam from the cathode impinges upon the first and second grids, there are produced the secondary electrons 31 from these grids, but these secondary electrons are obstructed by the separator 10, so they do not impinge upon the adjacent display segment 2. In this way, by selectively controlling the voltage applied to the first grids, the display segments 2R, 2G and 2B are rendered luminous selectively at a high luminance.

This luminescent display cell 40 is constructed in thin fashion as a whole. Besides, the low voltage-side leads such as the cathode and first and second grid leads are drawn out from the rear plate 1B side of the glass envelope 1, while the high voltage-side anode leads 12 are drawn out from the front panel 1A side. Therefore, possible dangers during discharge and wiring can be avoided, thus ensuring a stable luminescent display.

Moreover, since the anode voltage-applied separator 10 surrounds each display segment 2, a diffusion lens is formed by the separator 10. Therefore, even if only the first grids G$_1$ are curved and the second grid G$_2$ is flat (as shown in FIG. 6), the electron beam from cathode K spreads laterally (in the direction of the slits) and is radiated to the entire surface of the display segment 2. At the same time, the secondary electron from the first or second grid is obstructed by the separator 10, so the adjacent cut-off segment is not rendered luminous.

In the case of a color display (for example, in the case of a 9300° K. white picture), the luminance mixing ratio is about 7% blue, about 13% red, and about 80% green.

In the case where wire cathodes are used as an electron emission source, they are in many cases used in a temperature restriction area in order to maintain their service life. And the problem of making the luminance of the green cathode higher than that of the other cathodes can be solved by increasing the number of the green cathodes used. For example, two green cathodes K$_G$, one red cathode K$_R$, and one blue cathode K$_B$ may be used. As a result, the total amount of electrons for green becomes larger than that for red and blue, thus making it possible to effect a color display. It goes without saying that red and blue cathodes may also be used in plural numbers, which is effective in prolonging their service life. Thus, by increasing the number of green cathodes in comparison with the other cathodes, the luminance of green can be enhanced and a good white balance is obtainable. Consequently, an excessive load is not imposed on the cathodes, that is, the life of the luminescent display cell can be prolonged. Actually, two green cathodes are disposed in spaced relation at a distance of about 0.8 to 1 mm. As to the amount of electrons emitted, an increase of 70 to 80% can be expected though it does not become twice as large as that in the case of a single green cathode due to the electron scattering effect. Alternatively, the green luminance may be enhanced by making the area of the green phosphor layer larger than of the red and blue phosphor layers.

Since the wire cathodes are used in the temperature restriction area, that is, the loading of the oxide cathode is set at a ratio of one to several tens to prevent a red-looking appearance, the amount of electrons emitted per cathode is small. One method for solving this problem may be to substantially enlarge the surface area of oxide by winding a tungsten wire spirally, for example. But, in the case of a long spiral, it is likely that there will occur loosening or vibration of the cathode. In view of this point, such a construction as shown in FIGS. 10 and 11 is suggested.

In this example, a core 35 formed of a high-temperature material such as, for example, tungsten or molybdenum, is provided and its surface is coated with an insulating material 36 such Al$_2$O$_3$. Then tungsten wire 37 serving as a heater is wound spirally thereon and an electron emissive material 38, e.g. carbonate, is bonded to the spiral portion by spraying or electrodeposition to constitute a direct heating cathode 34. The core 35 is fixed at one end thereof to one support member 6 and at the other end thereof to the spring portion 7a of the other support member 7 by spot welding or other suitable means, it being stretched under tension. The tungsten wire is fixed between one support member 6 and a second support member 6' on the other side by spot welding or other suitable means.

Thus, in the above construction, the cathode is wound spirally onto the core 35 coated with the insulating material 36, and the core 35 is stretched by the spring portion, whereby problems such as shorting between spiral portions and thermal deformation of the spiral can be eliminated. Besides, the oxide surface area is substantially increased, and a uniform temperature distribution area (A) with reduced temperature difference between both ends and the center of the cathode becomes wider. As a result, the amount of electrons emitted can be increased, and as a whole, therefore, it is possible to increase the amount of allowable current per cathode. The curve I in FIG. 11 represents a temperature distribution.

Thus, the luminescent display cell is formed. In this case, since the separator supplied with the same high voltage as that applied to the display segments is positioned to surround the plural display segments, a diffusion lens is formed whereby an electron beam from the cathode is spread laterally and radiated to the entire surface of each display segment or element. Consequently, it is possible to make a display at a high luminance. Furthermore, by the presence of the separator, secondary electrodes from a control electrode or accelerating electrode are obstructed, not rendering the adjacent cut-off display segment luminous, and thus a stable luminescent display can be effected.

When a picture display device is formed by using the above luminescent display cell, the following assembling method is taken.

That is, a plurality of the above luminescent display cells 40, for example, 6 (column)×4 (row)=24 luminescent display cells are incorporated in a unit case 41 to form one unit as shown in FIG. 12. In mounting such plural display cells to the unit case 41, the cells 40 are fixed to the case 41 by molding with resin or the like. However, the anode voltage of the display cell 40 is as high as about 10 KV, so if the fixing is incomplete, the display cell 40 may become separated upon application of power from the surface, or the application of a liquid for removing stain or the like on the surface side. A change in conditions may also cause such trouble. Therefore, it is necessary to fix the display cells 40 firmly to the unit case 41. For this purpose, each display cell 40 is formed so that the front panel 1A of the glass envelope 1 overhangs outwardly beyond the side wall 1C. In this case, the front panel 1A may overhang throughout the circumference as shown in FIG. 13A, or it may overhang only in one direction as shown in FIG. 13B. On the other hand, the unit case 41 is constructed as shown in FIG. 14, that is, plural (24 in the illustrated embodiment) window holes 43 are formed in a front plate 42 of the unit case 41 in opposed relation to the display cells 40, and a stepped portion 44 in which is to be fitted the marginal portion of the front panel 1A of each display cell is formed in the back of the marginal portion of each window hole 43. The display cell 40 is fitted in the back of the front plate 42 so that its front panel 1A faces the window hole 43, and then is fixed from the back by the use of a fixing member 45 such as a resin mold or the like. In this case, since the front panel 1A overhangs outwardly as an overhang portion 50, this overhang portion is held between the fixing member 45 and the front plate 42 of the unit case 41, and thus, as a whole, the display cell 40 is fixed firmly to the unit case 41. If necessary, as shown in FIGS. 15 and 16, there may be provided a retaining piece 53 which is rotatable about a shaft 52 to hold the overhang portion 50 of the front panel 1A of each display cell between it and the front plate 42 of the unit case 41. Subsequent fixing with resin mold or the like will further ensure the fixing of the display cell. Since the display cell is of a high luminance, the front panel side with phosphor layers applied thereto is apt to become high in temperature, so it is necessary to cool it, for example, with liquid. For this purpose, at the time of mounting each display cell to the unit case, a packing 54, e.g. silicone rubber, is interposed between the stepped portion 44 of the front plate 52 of the unit case 41 and the front panel 1A, and a transparent plate 55 formed of polycarbonate or other material is disposed thereabove, and the space formed by the transparent plate 55, the front panel 1A and the window hole 43 of the unit case 41 is filled with a cooling liquid 56. In this case, the front plate 42 of the unit case 41 is formed with cooling liquid introducing slots 57 communicating with the window holes 43. Instead of using the cooling liquid 56, a fan is provided to perform the air-cooling for the display cell.

Then, a plurality of the above units are arranged in an X-Y matrix form, for example, 7 (column)×5 (row)=35 to form a block and then 5 blocks are arranged laterally to form a submodule. Then, a plurality of the submodules are combined in an X-Y matrix form, for example, 9 (column)× 4 (row)=36. By using a number of the submodules, a jumbo-size picture display tube of, for example, 25 m (column)×40 m (row) is constructed. In this case, the number of the display cells is $$36 \times 5 \times 35 \times 24 = 151,200$$

and the number of the display segments is 3 times the above number and hence about 450,000.

FIGS. 17A and 17B are respectively a front view and a cross-sectional view of whole of a built-up jumbo-size picture display device. The whole of this jumbo-size picture display device is a building which is, for example, 42 m in height and 47 m in width. The upper portion of this building is made as a display portion which is provided with 9 floors, each floor having the height of 2.688 m. On each floor there are located 4 submodules in the lateral direction. Further, on the lower portion of the building there are formed the stage for entertainments, an anteroom, the central control room for operating and managing the display device and the stage and so on.

By the above way, the picture display device is built. In this case, since 24 luminescent display cells from a unit and a number of the units are employed to assemble whole the picture display device, the display device becomes easy in handling and also easy in assembling. In this case, each unit is formed of a square shape of 40 cm in both height and width in the above example.

By the way, in such picture display device, when the display signal for each display cell is transmitted, it is impossible to perform the signal transmission in parallel for about 450,000 picture segments or elements. Thus, the signal transmission is carried out by the scanning method. In this case, however, the structure of the display device is of a unit utilization type, if the known line-sequence scanning is employed, a large number of the connections between the respective units in the lateral direction is required and hence the installation work thereof becomes complicated.

Further, since the display device is a jumbo one as set forth above, if the signal transmission is carried out in an analog fashion, there is easily caused an error such as a crosstalk, time-base error and so on. Thus, it may be considered that the signal is transmitted in the form of a digital signal. However, if a flat cable is generally used as the transmission line, the transmission speed is generally suppressed to about 300 kHz. On the other hand, the time to send the signal to whole the picture screen is limited to 1/30 second.

Further, in the above display device, the device is generally installed in the outside. In that case, depending on the night and day and further weather conditions such as fine weather, cloudy weather, rainy weather and the like, when the ambient brightness is changed, the appropriate brightness of the display becomes different. For example, when the appropriate brightness of the display is determined on the basis of the brightness of the daytime of the fine weather, such brightness becomes too high in the nightime so that it becomes impossible to see the display satisfactorily. Therefore, the brightness control is carried out and in that case, if the brightness steps of the display are decreased upon low brightness, it becomes impossible to expect that the picture image is displayed with high quality.

OBJECTS AND SUMMARY OF THE INVENTION

Accordingly, it is an object of the present invention to provide a video display system in which a signal can be easily transmitted.

Another object of the present invention is to provide a video display device capable of carrying out the brightness control with ease.

According to one aspect of this invention, there is provided a video display system comprising:

a display device including a plurality of display cells arranged in X-Y matrix form;

a video signal source for supplying a digital video signal;

a pulse width modulator connected to said video signal source for deriving a PWM signal corresponding to the brightness level of said digital video signal, said pulse width modulator including a counter supplied with said digital video signal as a datum signal and a clock signal generator for supplying a clock signal to said counter; and signal supplying means connected to said pulse width modulator for supplying said PWM signal to said display device and reproducing a picture thereon, characterized by control means connected to said clock signal generator for changing the frequency of the clock signal supplied to the counter and controlling the brightness of the picture reproduced on said display device.

The other objects, features and advantages of the present invention will become apparent from the following description taken in conjunction with the accompanying drawings through which the like references designate the same elements and parts.

BRIEF DESCRIPTION OF THE DRAWINGS

FIG. 4 is a partially cut-away perspective view of the luminescent display cell in FIG. 1;

FIG. 22 is a schematic diagram showing a PWM driving circuit according to the present invention.

DESCRIPTION OF THE PREFERRED EMBODIMENT

Now, the present invention will be described with reference to the attached drawings.

Figure 1:
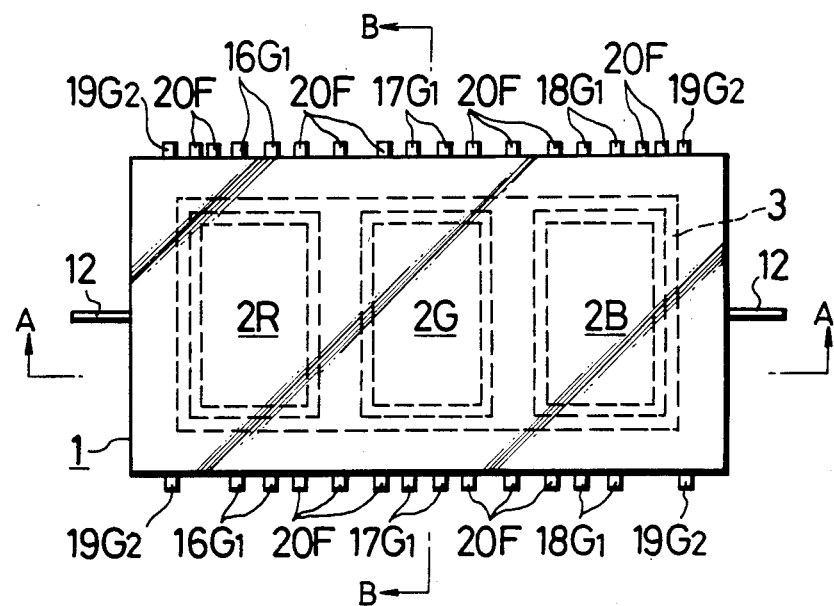
FIG. 1 is a front view of a luminescent display cell used in the present invention.
Figure 2:
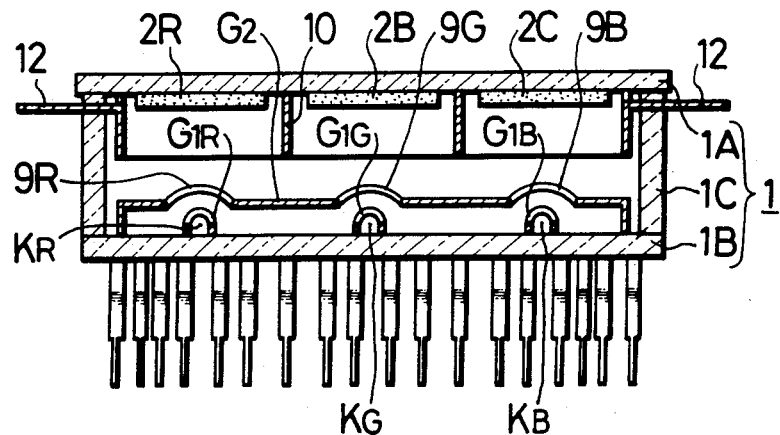
FIG. 2 is a sectional view taken on line A—A of FIG. 1.
Figure 3:
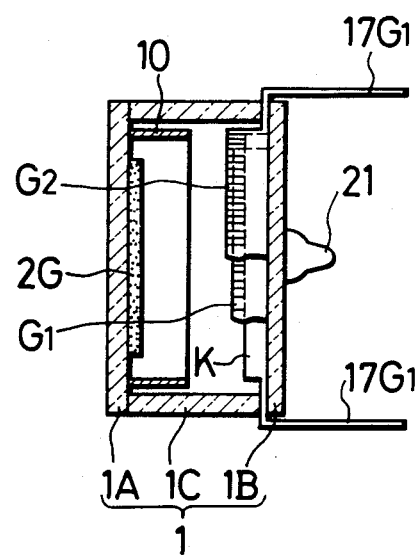
FIG. 3 is a sectional view taken on line B—B of FIG. 1.
Figure 5:
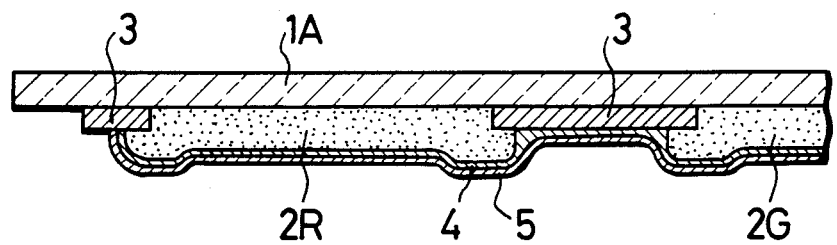
FIG. 5 is an enlarged sectional view of a display segment.
Figure 6:
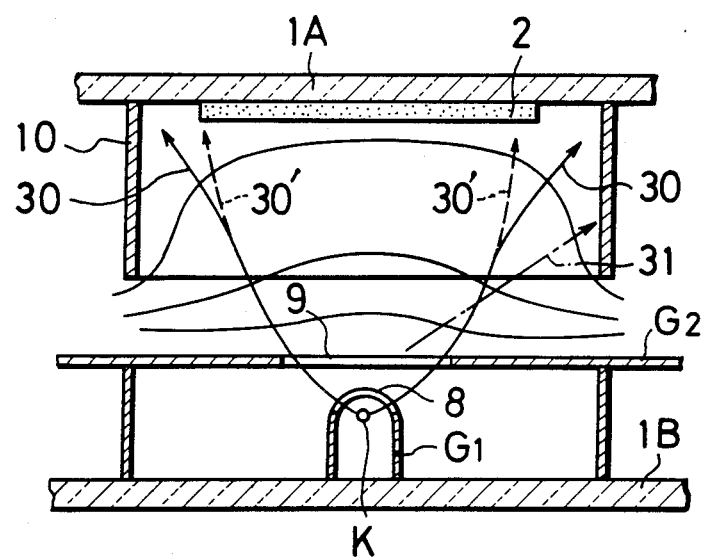
FIG. 6 is a sectional view illustrative of operation of a separator.
Figure 9:
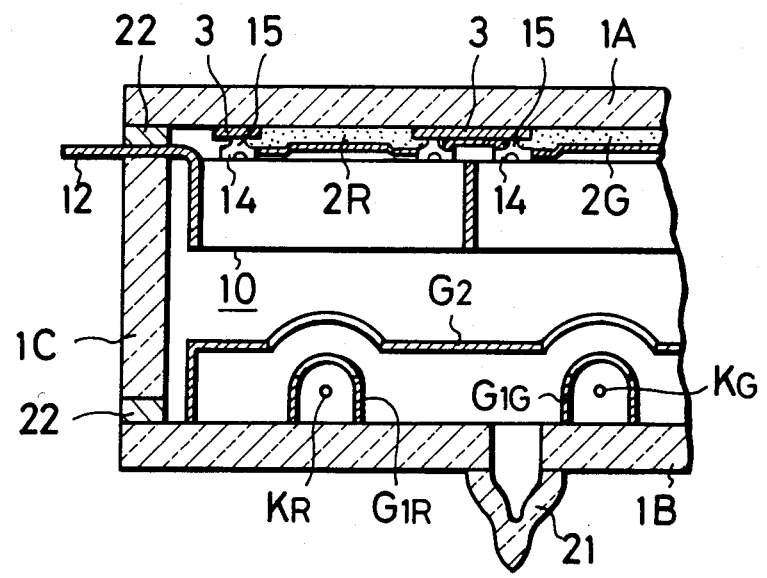
FIG. 9 is a sectional view of display segments and a separator portion.
Figure 7:
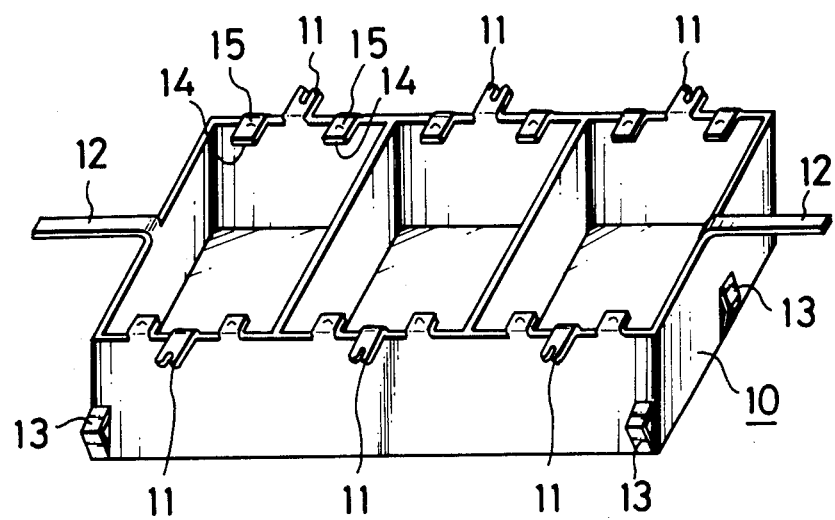
FIG. 7 is a perspective view of the separator.
Figure 8:
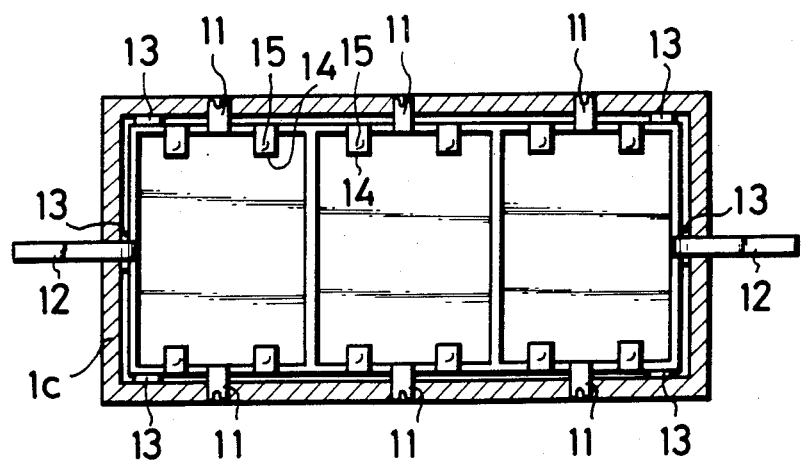
FIG. 8 is a plan view in which the separator is disposed within a side of an envelope.
Figure 10:
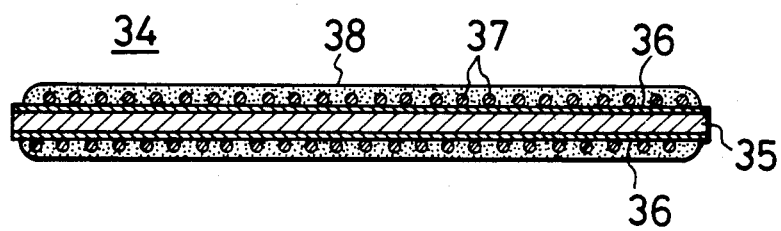
FIG. 10 is a sectional view showing another example of a wire cathode.
Figure 11:
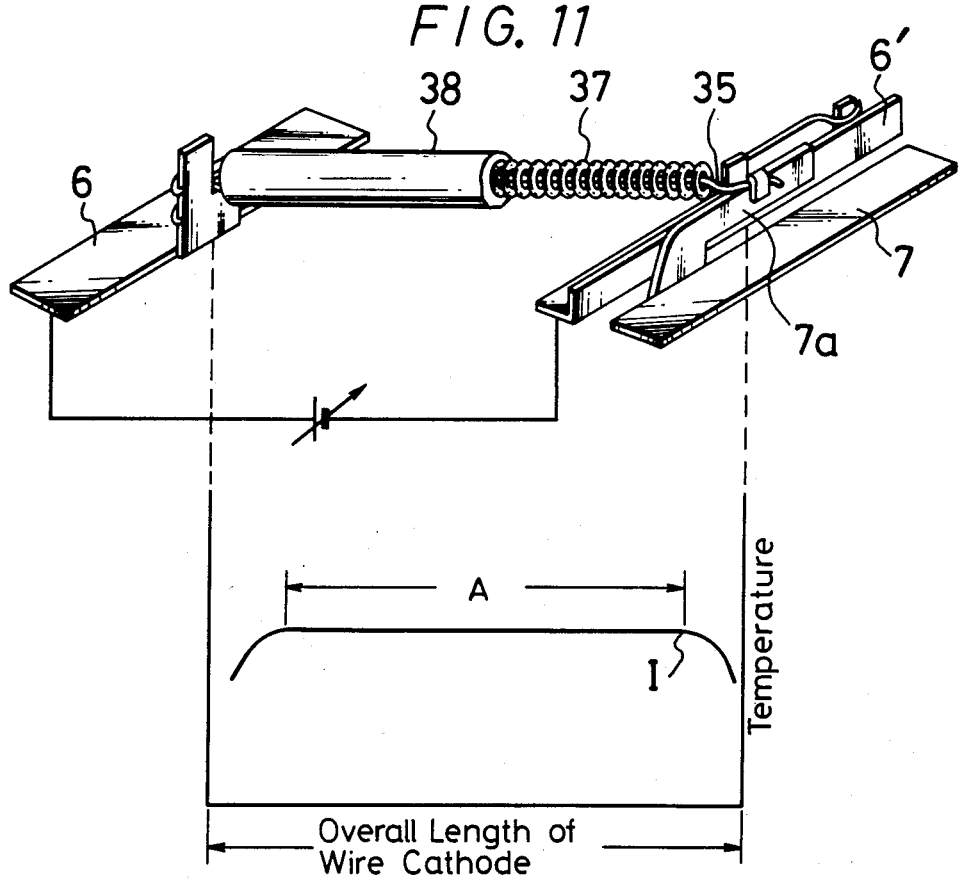
FIG. 11 is a perspective view showing a mounted state thereof.
Figure 12:
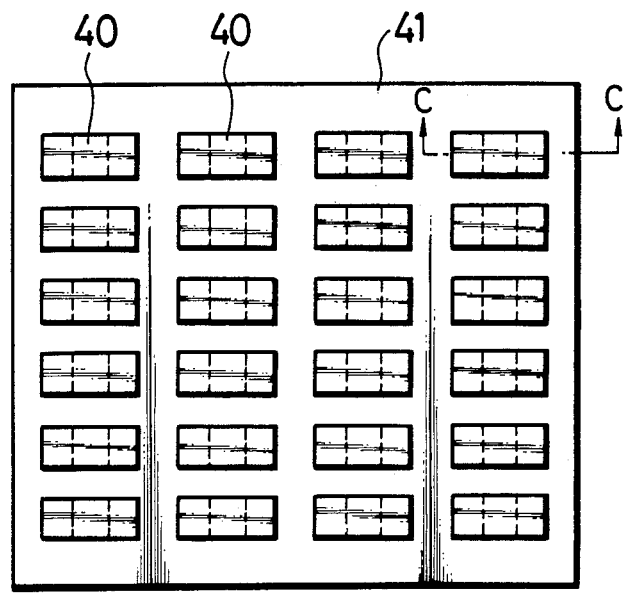
FIG. 12 is a front view of a single unit incorporating plural display cells.
Figure 13A:
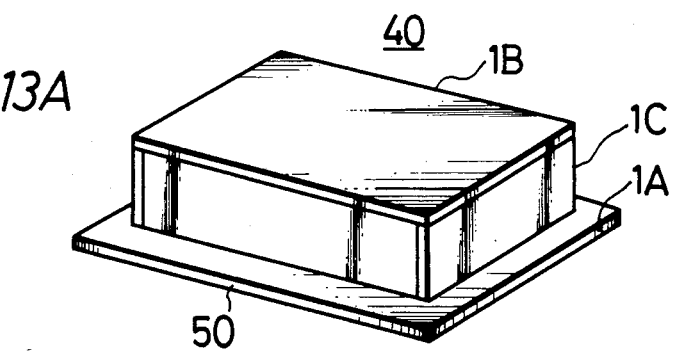
FIGS. 13A and 13B are perspective views showing other examples of display cells.
Figure 13B:
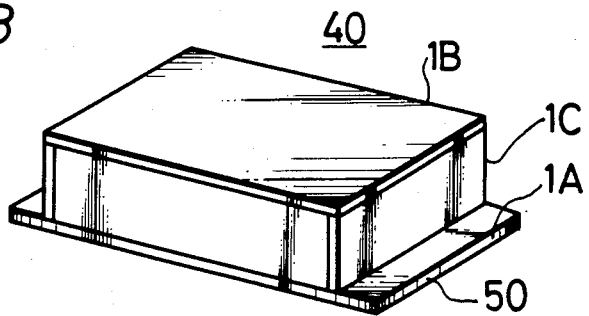
Figure 14:
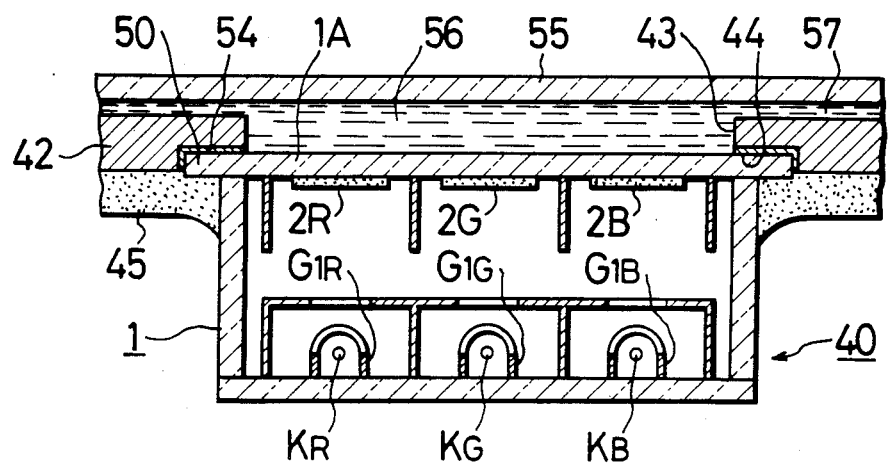
FIG. 14 is a sectional view taken on line C—C of FIG. 12.
Figure 15:
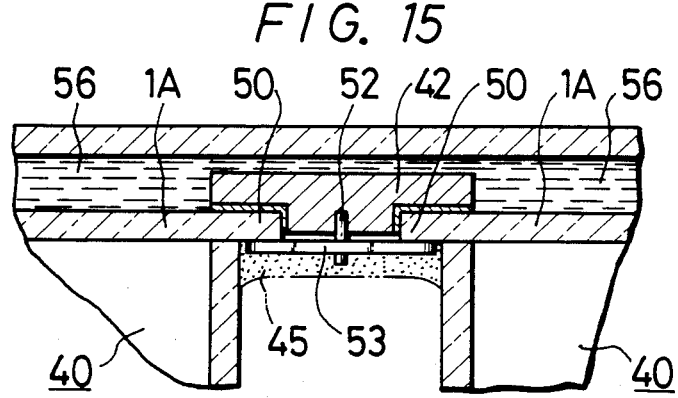
FIG. 15 is a sectional view showing another mounting method.
Figure 16:
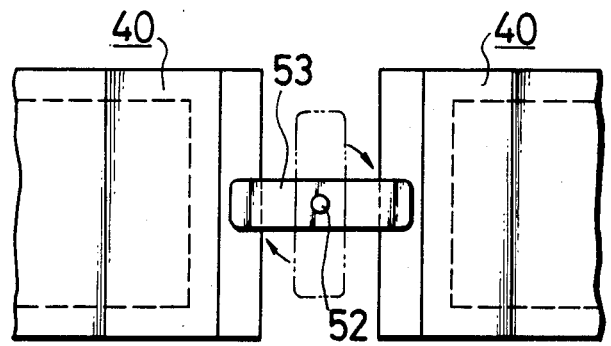
FIG. 16 is a rear view thereof.
Figure 17B:
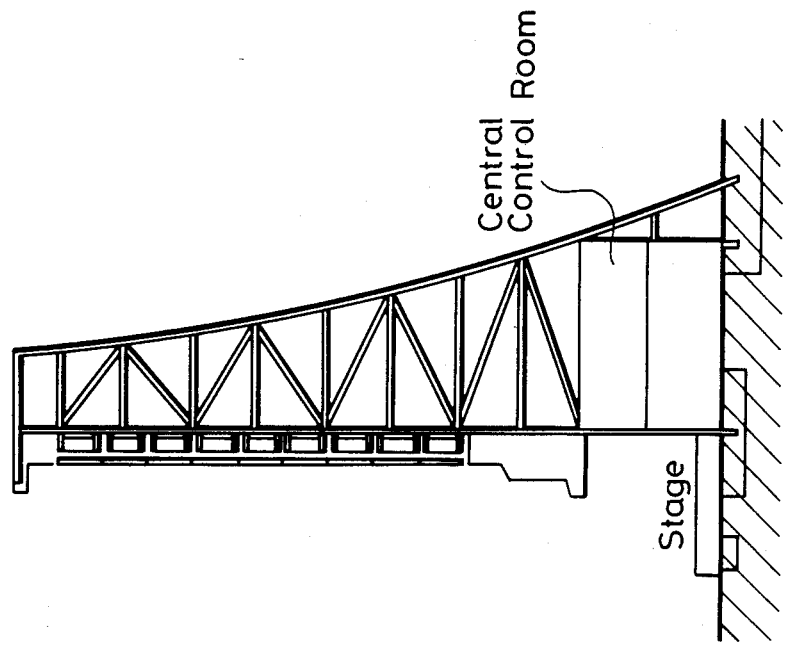
FIGS. 17A and 17B are respectively a front view and a cross-sectional view of a built-up jumbo-size display device.
Figure 17A:
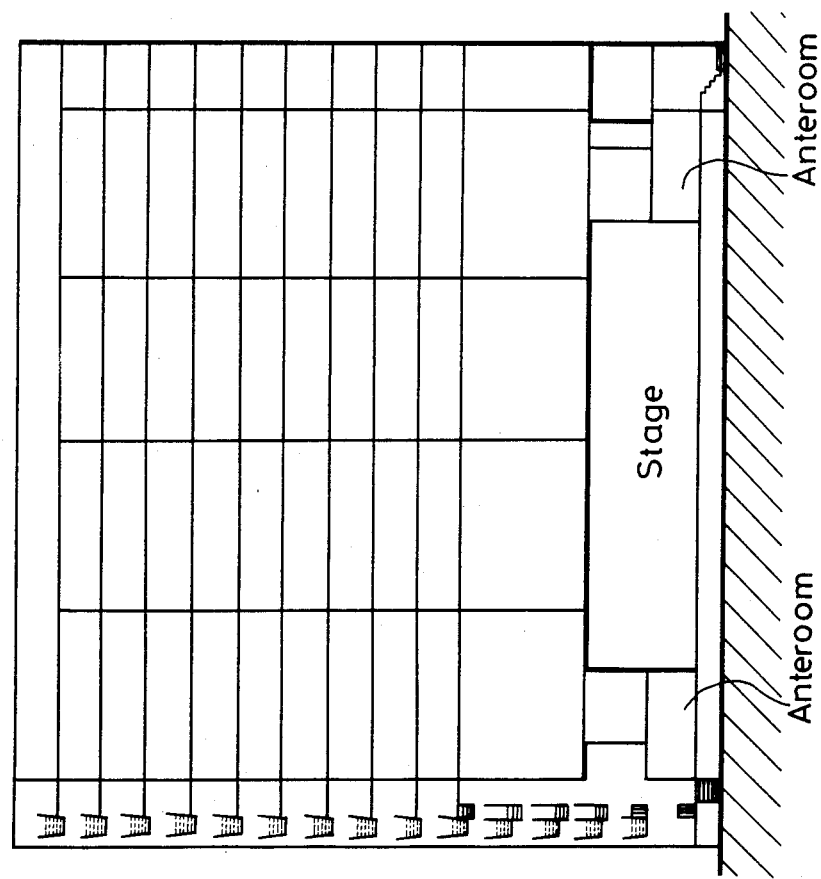
Figure 18:
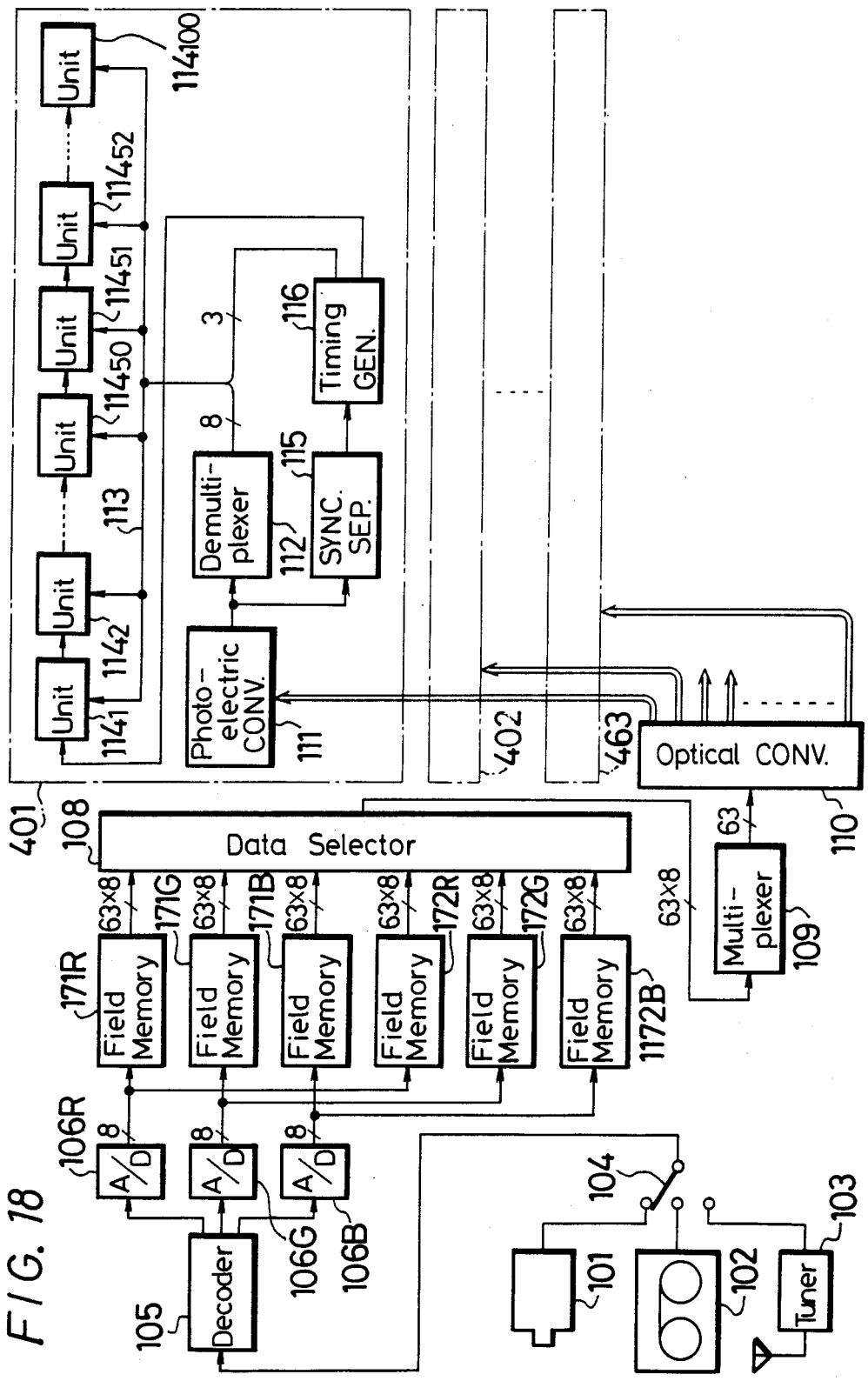
FIG. 18 is a block diagram showing a video display system according to the present invention.

FIG. 18 is a systematic block diagram showing an example of the video display system according to the present invention. In this example, the video signals from a television camera 101, a VTR (video tape recorder) 102, a tuner 103 and so on are selected by an input change-over switch 104. These video signals are each a composite video signal of, for example, the NTSC system. The video signal selected by the switch 104 is supplied to a decoder 105 in which it is decoded to three color component signals of red, green and blue. These three color component signals are respectively supplied to A/D (analog to digital) converters 106R, 106G and 106B and then converted to 8 bit parallel digital signals, respectively.

These digital signals are supplied alternately to memories 171 (171R, 171G, 171B) and memories 172 (172R, 172G, 172B) each of which has one field memory capacity. These memories 171 and 172 each form a scanning converter which provides 4 horizontal lines from 5 horizontal lines. Further, for 189 horizontal lines, for example, selected from each field of the scanning converted signal, there are derived one output at every 3 horizontal lines, totally 63 (×8 bit parallel) outputs.

Figure 19:
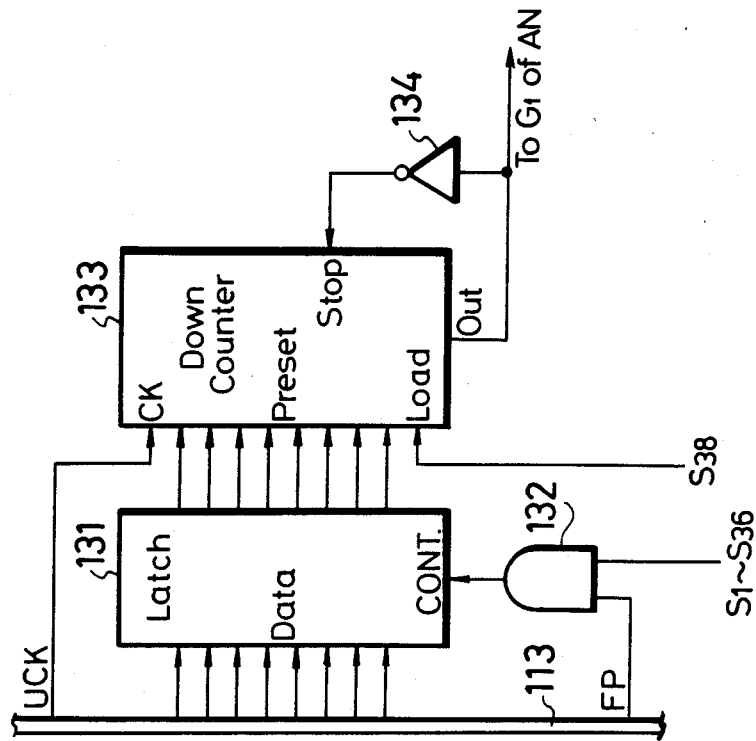
FIGS. 19 and 21 are schematic diagrams respectively showing a signal supplying system according to the present invention.

In this case, the order to derive the signal from the scanning converter is a specific one such that after the supply of the signal to one of the units described previously is completed, the supply of the signal to the next neighboring or adjacent unit will be done. That is, as shown in FIG. 19, when there are two adjacent units $U_1$ and $U_2$, in one field the digital data for a segment corresponding to each cell is sequentially derived from one memory in the numbered order and after the segment data corresponding to three horizontal lines 201 to 204, 205 to 208 and 209 to 212 in the left unit $U_1$ are completely derived, the segment data corresponding to three horizontal lines 213 to 216, 217 to 220 and 221 to 224 in the right unit $U_2$ are derived. Then, the segment data deriving is shifted to the right side unit successively. The segment data corresponding to the horizontal lines marked by the corresponding numbers with dash in FIG. 19 are derived from the other memory in the next field by the interlace scanning.

These segment data are derived at the same time from the respective memories 171 or 172, respectively. This data deriving is carried out such that 63 data at every 3 lines are simultaneously derived. The data thus derived are supplied to a data selector 108 in which at every field the red, green and blue data are dot-sequentially selected from the memory in which no writing is carried out to thereby form the data signal of 63 ($\times$8 bit parallel). These data signal formed are fed to a multiplexer 109 in which 8 bit parallel signals are respectively converted to serial data signals. The signals thus converted are supplied to an optical converter 110 and then converted thereby to the corresponding optical signal.

The optical signals of 63 data at every 3 horizontal lines are transmitted through optical-fiber cables 301, 302, ... 363 to center portions of lateral groups 401, 402, ... 463 respectively where each group represents the total units of the display device laterally arranged.

Then, for example, in the upper most group 401 of the units, the optical signal from the optical-fiber cable 301 is fed to a photo-electric converter 111 and converted thereby to the corresponding electrical signal. This converted data signal is supplied to a demultiplexer 112 in which the serial data signal is converted to the 8 bit parallel signal. This parallel data signal is supplied through a bus line 113 to, for example, 100 units $114_1$, $114_2$, ... $114_{100}$, which are laterally arranged, in parallel at the same time.

Figure 20:
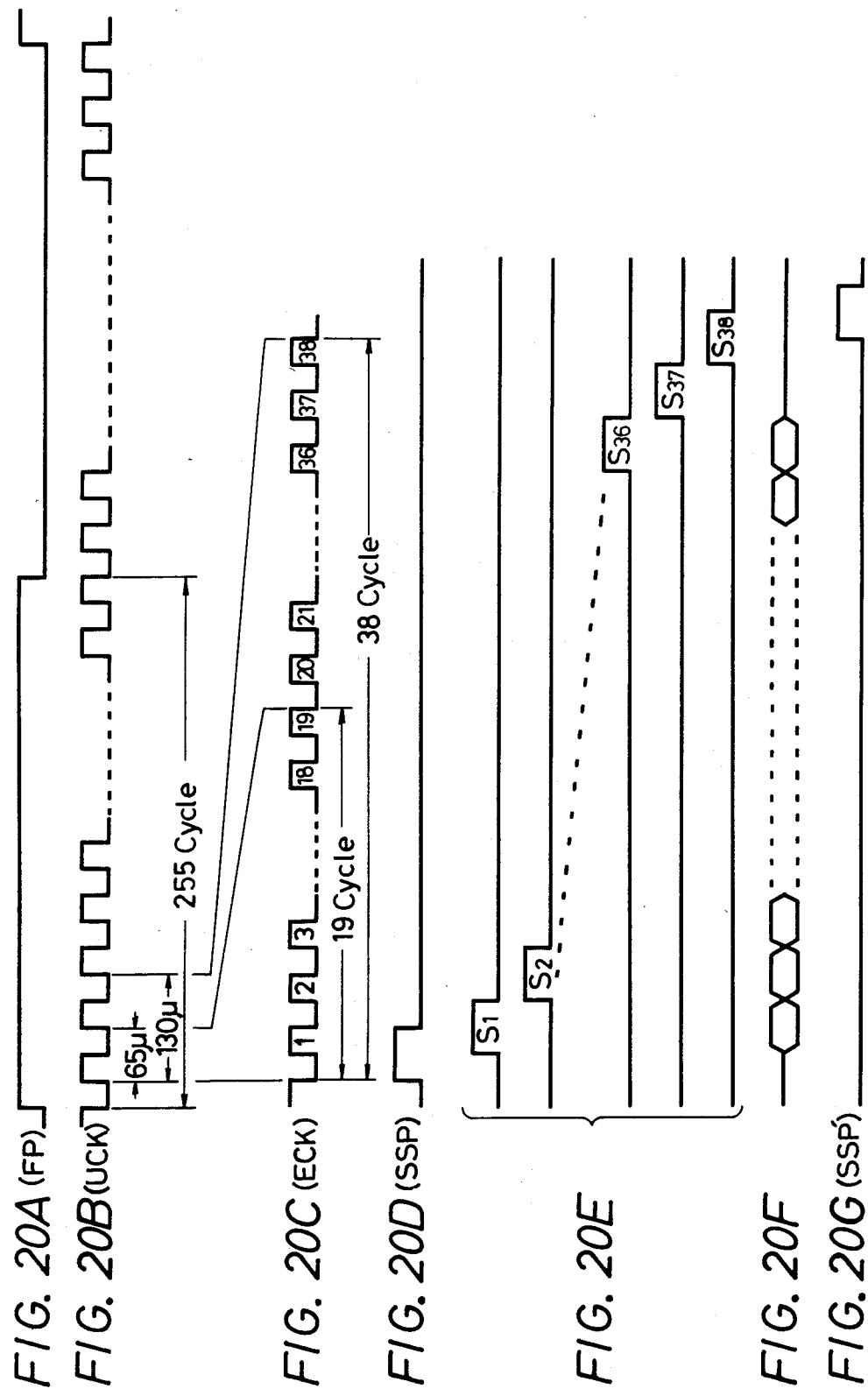
FIGS. 20A to 20G are waveform diagrams respectively to be used for explaining the video display system according to the present invention.

The signal from the photo-electric converter 111 is further supplied to a sync. separator 115 in which synchronizing signals are formed by a predetermined pattern generator and so on. The synchronizing signals therefrom are fed to a timing generator circuit 116 in which there are respectively generated a frame pulse signal FP which is inverted at every field as shown in FIG. 20A, a unit clock signal (UCK) which has 255 cycles during a half period (1 field) of the frame pulse signal as shown in FIG. 20B, an element clock signal ECK which contains 38 cycles during two cycles of the unit clock signal UCK as shown in FIG. 20C, and a start pulse SSP which is formed by one element clock signal amount at every inversion of the frame pulse signal as shown in FIG. 20D. These frame pulse signal, unit clock signal and element clock signal are supplied together with the above data signal through the bus line 113 to the respective units $114_1$, $114_2$, ... $114_{100}$ in parallel while the start pulse is supplied to the first unit $114_1$.

The operation similar to the above is carried out in each of the 63 groups 401, 402, ... 463.

Figure 21:
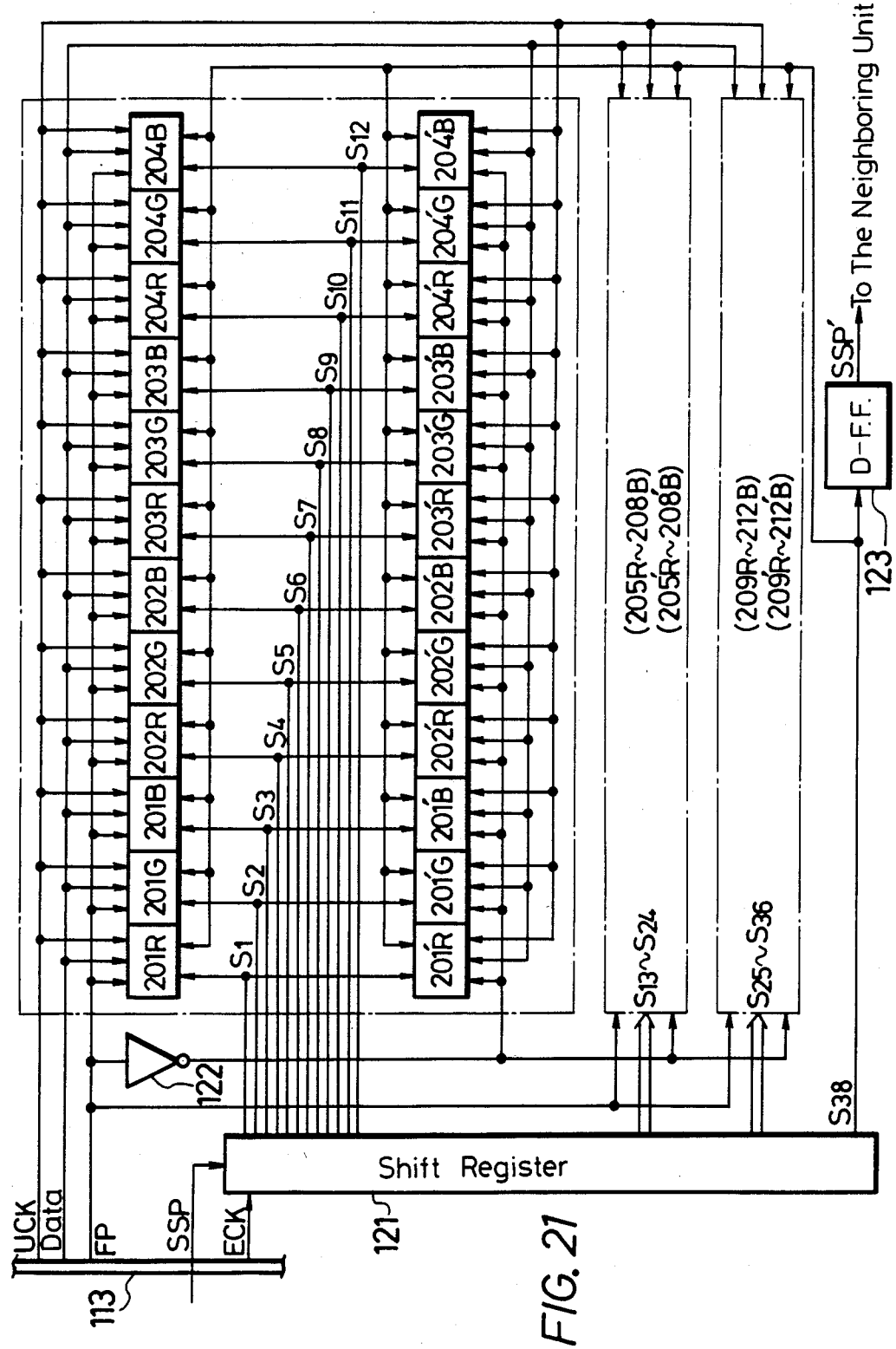

In each of the units above, the signal translating circuit is formed as shown in FIG. 21. In FIG. 21, 121 designates a shift register having 38 stages. In this case, the element clock signal ECK from the timing generator circuit 116 through the bus line 113 is supplied to the clock input terminal of the shift register 121 and the start pulse SSP is supplied to its data input terminal. Then, from the respective stages of the shift register 121 there are delivered sequentially shifted signals $S_1$, $S_2$, ... $S_{38}$ as shown in FIG. 20E. The signals $S_1$ to $S_{36}$ of these signals $S_1$ to $S_{38}$ are respectively supplied to the elements 201R, 201G, 201B, 202R, 202G, 202B, ... 212R, 212G, 212B of each of cells 201 to 212 and to elements 201'R, 201'G, 201'B, 202'R, 202'G, 202'B, ... 212'R, 212'G, 212'B of each of the cells 201' to 212'. In FIG. 21, the circuits in one-dot chain line block are equivalent with one another.

The data signal, as shown in FIG. 20F, from the bus line 113 are supplied to all the elements 201R to 212'B in parallel. The frame pulse signal FP is supplied to the elements 201R to 212B and to the elements 201'R to 212'B after being reversed in phase by an inverter 122.

The signal $S_{38}$ from the shift register 121 is supplied to a D-type flip-flop 123 which then produces a start pulse signal SSP' to be supplied to the next neighboring unit as shown in FIG. 20G.

The signal circuit which will drive each element is constructed as shown in FIG. 22. In FIG. 22, 131 designates a latching circuit of 8-bit which is supplied at its data input terminals with the data signal from the bus line 113. An AND circuit 132 is provided which is supplied with the frame pulse signal FP or its inverted signal and one of the signals $S_1$ to $S_{36}$. The output from the AND circuit 132 is supplied to the control terminal of the latching circuit 131. A down counter 133 of 8-bit is provided which is supplied at its preset terminals with the output from the latching circuit 131, at its load terminal with the load pulse (signal $S_{38}$) from the shift register 121 and at its clock input terminal with the unit clock signal UCK from the bus line 113, respectively. When the counter 133 is in a condition except all-zero condition, it produces an output signal which is supplied to the first grid $G_1$ of each element mentioned above. The output signal of the counter 133 is phase-inverted by an inverter 134 and then supplied to the count-stop terminal of the counter 133.

Accordingly, in each element of each unit, at the timings of the signals $S_1$ to $S_{36}$, the data from the bus line 113 are latched to the latching circuit 131 of the corresponding element and then held therein. The data held therein are preset to the counter 133 at the timing of the signal $S_{38}$. The preset data are then counted down until the counter 133 becomes in all-zero condition so that at the output terminal of the counter 133 there is developed the PWM signals in accordance with each data signal. In this case, the counter 133 counts down the preset data in response to the unit clock signal UCK. Since this unit clock signal has 25 cycles during 1 field period, at the data being largest value, a display element is displayed during one field period continuously while at the data being smallest value the display element is not displayed so that the display therebetween can be divided into 256 brightness steps. The first grid of each element can be driven by the PWM signal.

Further, at the timing of the signal $S_{38}$ the start pulse signal for the next neighboring unit is produced. Thereafter, the operation similar to the above operation is sequentially carried out for 100 units laterally arranged. Moreover, the data latching operation of each unit is performed during the 2-cycle period of the unit clock signal UCK so that such operation for 100 unit laterally arranged is completed in 200 cycles. Therefore, by utilizing the remaining 55 cycles, special control signals such as the synchronizing signal and so on can be transmitted.

Since in the next field the frame pulse signal FP is inverted in phase, the similar operation is carried out for the other picture elements of the interlace scanning. At this time, the preset pulse is supplied to the picture elements which were driven in the previous field, so that the same display is performed twice on each picture element during the successive 2 field intervals.

Thus, the displays are performed on 100 units which are laterally arranged. Further, such display is performed for the 63 vertical direction groups of units in parallel at the same time, whereby whole a picture is displayed.

Figure 23:
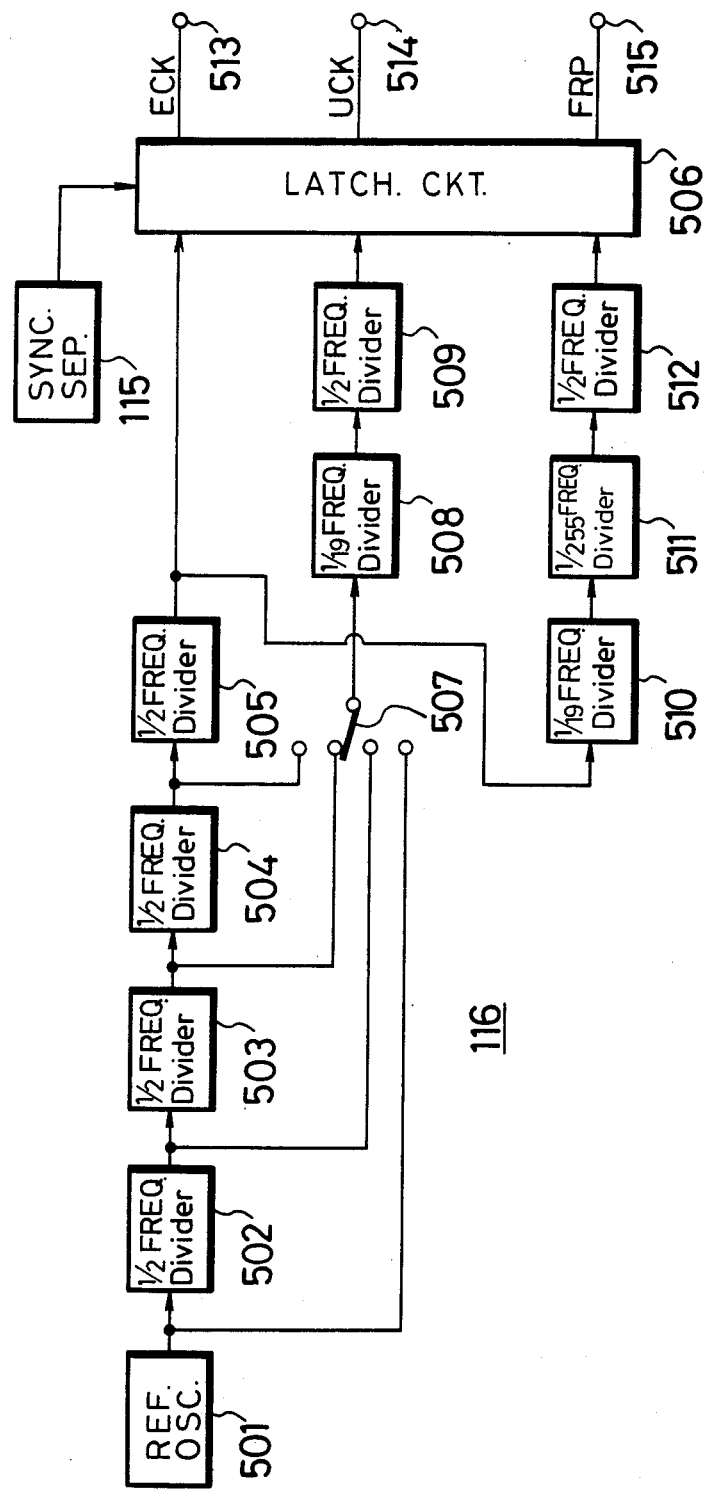
FIG. 23 is a circuit block diagram showing a practical example of a timing generator circuit used in this invention.

Further, in the above display device, the timing generator circuit 116 is practically formed as shown in FIG. 23. In FIG. 23, a signal of, for example, 4.646549 MHz from a reference oscillator 501 that is made of a crystal and the like is supplied to four $\frac{1}{2}$ frequency dividers 502 to 505 which are connected in cascade, from which a signal of about 300 kHz is derived and then is supplied to a latching circuit 506. The respective output signals from the reference oscillator 501 and the frequency dividers 502 to 504 are supplied to a switch 507 and the signal from this switch 507 is supplied through a 1/19 frequency divider 508 and a $\frac{1}{2}$ frequency divider 509 to the latching circuit 506. Further, the signal from the frequency divider 505 is supplied through a 1/19 frequency divider 510, a 1/255 frequency divider 511, and a $\frac{1}{2}$ frequency divider 512 to the latching circuit 506. The synchronizing signal from the synchronizing separator 115 is supplied to the latching circuit 506, in which the synchronization is carried out.

In this timing generator circuit 116, an element clock (ECK) of about 300 kHz is derived from the frequency divider 505 and supplied to the latching circuit 506 thereby synchronized to the synchronizing signal and then delivered to a terminal 513. A frame pulse (FP) having a period of $255 \times 38$ times the period of the element clock is derived from the frequency divider 512, synchronized to the synchronizing signal and then delivered to a terminal 515.

When the movable contact of the switch 507 is connected to the uppermost contact, the frequency divider 509 forms a unit clock (UCK) having a period 19 times the period of the element clock. Then, this unit clock is synchronized to the synchronizing signal in the latching circuit 506 and then delivered to a terminal 514, while when the movable contact of the switch 507 is changed in position, the frequency of the unit clock is sequentially changed in the lower side so as to become 2, 4 and 8 times the first one.

When these signals are supplied to the clock terminal of the above down counter 133, as the frequency is increased, the length of the PWM pulse is sequentially changed to $\frac{1}{2}$, $\frac{1}{4}$ and $\frac{1}{8}$, respectively.

Accordingly, the brightness to be displayed is controlled to become $\frac{1}{2}$, $\frac{1}{4}$ and $\frac{1}{8}$, respectively. At that time, the number of the brightness steps by the PWM is still in a range from 0 to 255 and it is possible to prevent the number of the brightness steps from being decreased by the brightness control.

Thus, a jumbo-size picture of 25 m (column)$\times$40 m (row) is displayed. According to the above picture display system, since the data are sequentially transmitted at every unit and after the data transmission of one display unit is completed, the data of the next neighboring display unit is transmitted, the display operation is completed at each unit. As a result, the wiring between the respective units is only one line to transmit the start pulse SSP' from one unit to the next unit so that the connection thereamong becomes quite simple. The supply of the data signal and so on from the bus line to each unit can be performed by using a multi-contact connector.

Therefore, when the units are attached, exchanged or the like, the work becomes simple and the assembling and repairing thereof become quite easy. For example, when one unit becomes out of order, it is sufficient that the troubled unit is exchanged for a new good unit. Upon this exchange, since the number of the lines for electrical connection is small, the exchange can be done rapidly and easily. Further, such a fear that any trouble is caused by the contact miss and so on can be reduced.

Further, as emergency measure, it is enough that a counter which can count up to 38 is connected between the input and output terminals for the start pulse of a troubled unit and then this troubled unit is removed. In this case, no bad influence exerts on the other units. Furthermore, when the operation of a certain unit itself is checked, since the signal is completed within the unit, the check is very easy.

Also, since the data is transmitted in parallel to every laterally arranged unit, the transmission speed is made low. That is, the data transmission speed in the above embodiment becomes as follows.

$$60 \times 255 \times 38/2 = 290.7 \text{ (kHz)}$$

This speed is lower than the tolerable range (300 kHz) of a flat cable (bus line), so that a conventional flat cable becomes possible to be employed.

Further, the data transmission is such one that the data of 2-field amounts of the interlace scanning are transmitted in one frame interval and the data is rewritten only once in each picture element at one frame interval. However, the display is repeated in sequential 2 fields and the display frequency is 60 Hz so that the generation of flicker can be suppressed.

Furthermore, in the above display device, by changing the frequency of the clock pulse of the PWM, it is possible to carry out the brightness control very easily, whereby regardless of the weather conditions, the display with the appropriate brightness can be carried out at all times. Moreover, it is possible to prevent the number of the brightness steps from being decreased.

As set forth above, according to the present invention, the signal transmission becomes simple and the brightness control can be carried out with ease.

The above description is given on a single preferred embodiment of the invention, but it will be apparent that many modifications and variations could be effected by one skilled in the art without departing from the spirits or scope of the novel concepts of the invention, so that the scope of the invention should be determined by the appended claims only.

We claim as our invention:
1. A video display system comprising:
   a display device including a plurality of display cells arranged in an X-Y matrix form;
   a video signal source for supplying a digital video signal;
   a pulse width modulator connected to said video signal source for deriving a PWM signal corresponding to a brightness level of said digital video signal, said pulse width modulator including a counter supplied with said digital video signal as a datum signal and a clock signal generator for supplying a clock signal to said counter; and
   signal supplying means connected to said pulse width modulator for supplying said PWM signal to said display device and reproducing a picture thereon, characterized by
   control means connected to said clock signal generator for changing the frequency of the clock signal sup- plied to the counter and controlling the brightness of the picture reproduced on said display device.

2. A video display system according to claim 1, wherein said control means comprises a plurality of frequency dividers connected in cascade with said clock signal generator and switching means for selecting an output from one of said frequency dividers and supplying the same to said counter as a clock signal.

3. A video display system according to claim 1, wherein said counter counts down the clock signal supplied thereto.

4. A video display system according to claim 3, wherein said pulse width modulator further comprises latching means for latching the digital video signal supplied from said video signal source and means for supplying the latched video signal to said counter as a preset datum thereof.

5. A video display system according to claim 1, wherein said video signal source comprises an analog to digital converter circuit for converting an input analog video signal to a digital video signal.

* * * * *